United States Patent
Hosini et al.

(10) Patent No.: US 8,638,576 B2
(45) Date of Patent: Jan. 28, 2014

(54) VOLTAGE SOURCE CONVERTER AND A METHOD FOR FAULT HANDLING THEREOF

(71) Applicants: Falah Hosini, Vasteras (SE); Mauro Monge, Vasteras (SE)

(72) Inventors: Falah Hosini, Vasteras (SE); Mauro Monge, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/625,621

(22) Filed: Sep. 24, 2012

(65) Prior Publication Data

US 2013/0026841 A1 Jan. 31, 2013

Related U.S. Application Data

(63) Continuation of application No. PCT/EP2010/053784, filed on Mar. 23, 2010.

(51) Int. Cl.
 *H02H 7/10* (2006.01)
 *H02H 7/122* (2006.01)

(52) U.S. Cl.
 USPC .......................................... 363/50; 363/56.02

(58) Field of Classification Search
 USPC ........... 363/17, 37, 56.02, 65, 98, 132, 50, 51
 See application file for complete search history.

(56) References Cited

U.S. PATENT DOCUMENTS

| | | | |
|---|---|---|---|
| 5,986,909 A | 11/1999 | Hammond et al. | |
| 2008/0031024 A1 | 2/2008 | Pasuri et al. | |
| 2008/0232145 A1* | 9/2008 | Hiller et al. | 363/56.01 |
| 2008/0252142 A1* | 10/2008 | Davies et al. | 307/42 |
| 2010/0118453 A1* | 5/2010 | Dorn et al. | 361/54 |
| 2011/0140530 A1* | 6/2011 | Demetriades et al. | 307/77 |
| 2011/0267852 A1* | 11/2011 | Asplund | 363/55 |
| 2013/0208521 A1* | 8/2013 | Trainer et al. | 363/126 |

FOREIGN PATENT DOCUMENTS

| | | |
|---|---|---|
| DE | 10103031 A1 | 7/2002 |
| DE | 10327344 A1 | 1/2005 |
| WO | 2008125494 A1 | 10/2008 |

OTHER PUBLICATIONS

International Search Report & Written Opinion of the International Searching Authority; Application No. PCT/EP2010/053784; Issued: Jan. 31, 2011; Mailing Date: Feb. 18, 2011; 13 pages.
Ainsworth, et al.; "StaticVAr Compensator (STATCOM) Based on Single-Phase Chain Circuit Converters"; IEE Proc.-Gener. Transm. Distrib., vol. 145, No. 4, Jul. 1998; pp. 381-386.
The Korean Intellectual Property Office Notice of Grounds for Rejection Application No. 2012-7027524 Issued: Oct. 7, 2013 8 pages.

* cited by examiner

*Primary Examiner* — Jue Zhang
(74) *Attorney, Agent, or Firm* — St. Onge Steward Johnston & Reens LLC

(57) ABSTRACT

A voltage source converter having a plurality of cell modules connected in series, each cell module including a converter unit having an ac-side and a dc-side, and the voltage source converter includes a control unit adapted to control the converter units, where at least one of the cell modules includes a second redundant converter unit having an ac-side which is connected in parallel with the ac-side of the first converter unit and the control unit is configured to substantially synchronously control the first and the second converter units.

18 Claims, 6 Drawing Sheets

VOLTAGE SOURCE CONVERTER AND A METHOD FOR FAULT HANDLING THEREOF

FIELD OF THE INVENTION

The present invention relates to a voltage source converter having a plurality of cell modules connected in series, each cell module comprising a converter unit having an ac-side and a dc-side, and the voltage source converter comprises a control unit adapted to control the converter units. The present invention further relates to a method for fault handling of a cell module in a voltage source converter.

BACKGROUND OF THE INVENTION

Within flexible alternating current transmission systems (FACTS) a plurality of control apparatus are known. One such FACTS apparatus is a static compensator (STATCOM). A STATCOM comprises a voltage source converter (VSC) having an ac-side connected to a high voltage transmission line or a medium voltage distribution line in an electrical power system and a dc-side connected to a temporary electric power storage means such as capacitors. The STATCOM transforms a dc-voltage on its dc-side into an ac-voltage on its ac-side and can from the power system be seen as a voltage source with variable amplitude and phase angle. The STATCOM can supply reactive power to, or absorb reactive power from, the transmission line or distribution line independently of the voltage of the line.

In one type of multilevel VSC each phase includes a plurality of single phase full-bridge converters connected in series. These single phase full-bridge converters are sometimes referred to as chain-link cells and are in the following denoted cell modules. In FIG. 1 the cell module 6 includes four valves 1-4, each valve including a transistor switch, such as an insulated gate bipolar transistor (IGBT). It is noted that other semiconductor switching devices could be used, for example gate turn-off thyristors (GTO) or integrated gate commutated thyristors (IGCT). A free-wheeling diode, also denoted anti-parallel diode, is connected in parallel with each transistor switch and conducts in the opposite direction of the switch. The valves 1-4 are connected in an H-bridge arrangement with a capacitor unit 5. The cell module further includes a valve controller 11 adapted to control the valves in order to transform a dc-voltage on its dc-side into an ac-voltage on its ac-side.

In comparison with a conventional two-level or three-level VSC, smoother ac current and ac-voltage waveforms are possible to obtain with lower switching frequency and minimal filtering. Each phase of the multilevel VSC includes a number of series-connected cell modules and a line inductor connected in series with the cell modules for current control and filtering purposes. The number of cell modules is proportional to the ac-voltage level of the transmission line or distribution line to which it is connected. Consequently, the VSC can include a large number of cell modules in series. In FIG. 2 is shown one phase of such a multilevel converter connected to the high voltage transmission line or medium voltage distribution line 7 in an electrical power system. The phases of the VSC can be connected in a delta-arrangement as well as in a wye-arrangement. In this example the phase includes four cell modules 6 connected in series with a line inductor 8. Each cell module 6 in FIG. 2 includes a capacitor unit 5 and a plurality of electrical valves. The VSC includes a control unit configured to control the valves according to a switching pattern, for example by using a suitable pulse width modulation (PWM) technique, in order to transform the dc-voltage on its dc-side into an ac-voltage on its ac-side. Each valve is switched on and off a number of times during a fundamental frequency cycle of the ac system. By controlling the timing of the switching within such fundamental frequency cycles, the cell modules provide a desired ac-voltage, being the sum of the ac-voltages of each cell module.

As a large number of cells may be used in series to achieve the ac-voltage level of the transmission line or distribution line, a failure in a single cell module could lead to a necessitated shut-down of the entire VCS if no measures is taken. Consequently, to provide high reliability and availability of the VSC, some type of bypass arrangement is used to be able to continue operation of the VSC. A number of redundant cell modules are provided to replace failed cell modules. If the system is kept operational for the duration of a service interval, the failed modules can be replaced during a scheduled maintenance.

To be able to bypass a faulty cell module, it is necessary to provide zero voltage across the ac terminals of the cell. This can be achieved by using a very fast mechanical switch, a solid-state switch or a combination of both to allow for low power losses.

One example of a converter including a series connection of cell modules and a short circuit device is disclosed in WO-2008/125494 where each cell module of the converter is associated with a short circuit device, e.g. a vacuum switching tube, for short circuiting the cell module. The short circuit device enables safe bridging of a defective cell module.

A problem with mentioned solutions for bypassing failed cell modules is the interruption of the load current i.e., the delay between the failure of the cell module and the bypass performed by the switch. When a cell module fails and goes into an open circuit the load current is interrupted which in combination with a high circuit loop inductance will result in a high voltage across the cell module and extreme energy development which could destroy adjacent equipment.

SUMMARY OF THE INVENTION

It is an object of the invention to provide a voltage source converter which overcome or at least alleviate the above-mentioned problems.

According to one aspect of the invention this object is achieved by a modular energy storage device referred to as a voltage source converter.

The voltage source converter having a plurality of cell modules connected in series, each cell module comprising a converter unit having an ac-side and a dc-side, and the voltage source converter comprises a control unit adapted to control the converter units is characterised in that at least one of the cell modules comprises a second redundant converter unit having an ac-side which is connected in parallel with the ac-side of the first converter unit and the control unit is configured to synchronously control the first and the second converter units.

The at least one cell module is formed with two identical converter units, the ac-side of the first converter unit being connected in parallel with the ac-side of the second redundant converter unit. Since the first and second converter units are controlled synchronously with the same control signals the load current will not be interrupted in case of a failure in one of the first and second converter units and consequently the failure does not result in a high voltage and extreme energy development in the cell module. As a result the failed cell module will not run a risk of destroying any adjacent equipment or jeopardizing the continuing operation of the voltage source converter.

In an embodiment of the invention each of the first and second converter units includes a plurality of electrical valves and the control unit is configured to control the valves according to a first switching pattern during normal operation of the converter units and according to a second switching pattern, having a lower switching frequency than the first switching pattern, upon detecting a failure in one of the first and second converter units.

Each of the first and second converter units includes a dc link capacitor bank and a plurality of electrical valves. During the normal operation the control unit controls the valves according to a first switching pattern, for example by using a suitable PWM technique, in order to transform a dc-voltage on the dc-side of the first and second converter units into an ac-voltage on the ac-side of the first and second converter units. Each valve is switched on and off a number of times during a fundamental frequency cycle of the ac transmission line or distribution line to which the voltage source converter is connected. By controlling the timing of the switchings within said fundamental frequency cycles, the total number of converter units will provide a desired ac-voltage of the voltage source converter being the sum of the ac-voltages of each cell module. During the normal operation the load current through the voltage source converter will be uniformly, or close to uniformly, shared between the first and second converter units, respectively.

The first and second converter units are designed with an overloading capacity implying that each of the first and second converter units are able to take over the current from its corresponding parallel-connected converter unit in case of a failure in said converter unit as long as thermal or electrical limits of the converter units are not exceeded. To avoid excessive temperatures of the converter units, the control unit can control the healthy, non-failed, converter unit according to the second switching pattern with the lower switching frequency. Since the switching losses will be reduced, the moment in time when the converter unit reaches its thermal limit will be delayed. This extra time can be used by the control unit to identify which type of failure that has occurred and analyse the possibility to take counteractions. There is also a possibility that the failure is of a temporary nature which will give an opportunity to resume the first switching pattern. This is an advantage as the voltage source converter only has a limited number of redundant cell modules to replace failed cell modules.

According to an embodiment of the invention the second switching pattern is designed to control the valves to provide zero or close to zero output voltage at the ac-side of each of the first and second converter units. The zero output voltage can be achieved by controlling the electrical valves of the first and second converter unit such that forward-biased electrical valves of the first and second converter units are switched on. Besides the zero output voltage this switching pattern will result in a switching frequency which is equal to the fundamental frequency of the ac transmission line or distribution line as opposed to the first switching pattern where each valve is switched on and off a number of times during the fundamental frequency cycle. The advantages with this embodiment is the same as described in the paragraph above but since the cell module provides zero or close to zero output voltage at its ac-side, the cell module will not contribute to the total output voltage of the voltage source converter. However, since the switching losses are reduced to an absolute minimum the thermal limit will be delayed to a maximum extent.

According to an embodiment of the invention the at least one cell module further includes a bypass switch configured to bypass the cell module upon receiving a triggering signal from the control unit.

With the failure of one of the first and second converter units another failure in the still healthy converter unit would jeopardize the functionality of the entire voltage source converter. To avoid an emergency shut-down of the voltage source converter, the bypass switch is provided to bypass the load current and accordingly to ensure a possibility to continue operation of the voltage source converter. However, the bypass switch can be a simple mechanical closing switch with no special requirements on speed of operation etc. owing to the second redundant converter unit and its overloading capacity which will ensure a maintained current path for the load current. Once the bypass switch has been closed it will not be opened again. A mechanical bypass switch has the advantage of low conduction losses, however semiconductor switches such as IGBTs and MOSFETs can be used.

According to an embodiment of the invention the control unit includes a fault detecting unit adapted to detect the presence of a failure in one of the converter units and upon detecting that the failure has disappeared the control unit is configured to control the valves according to the first switching pattern. The fault detecting unit will detect the presence of a fault based on information provided by available sensors included in the control unit. If the failure disappears the control unit has a possibility to resume the first switching pattern as long as the cell is not bypassed by the bypass switch. This is an advantage since the number of redundant cell modules is limited and there is a need for a certain number of cell modules in operation to maintain the desired voltage level.

According to an embodiment of the invention the control unit is adapted to generate said triggering signal to the bypass switch at a certain time after the occurrence of a failure has been detected in any of the first and second converter units. The load current through the still healthy converter unit will increase after the occurrence of the failure and thus the temperature will also increase. If said healthy converter unit exceeds its thermal limit there is a risk of a failure also in the still healthy converter unit. On the other hand, it is an advantage to delay the activation of the bypass switch as long as possible for reasons mentioned above. A convenient way to accomplish such a delay is by generating the triggering signal to the bypass switch a certain time after the occurrence of the failure has been detected.

According to an embodiment of the invention the control unit is adapted to generate said triggering signal to the bypass switch when the temperature of the at least one cell module exceeds a threshold value. By measuring the temperature of the cell module, the optimal delay of the bypass activation switch can be more accurately determined.

According to an embodiment of the invention the voltage source converter includes a fault detecting unit further including a dc-voltage monitoring module adapted to continuously monitor the dc-voltage across each of the first and second converter units and the fault detecting module is adapted to compare the dc-voltages across the first and second converter units and on basis thereon detect a failure in one of the converter units.

The dc-voltages across each of the first and second converter units are normally equal. A divergence of said dc-voltages from each other indicates that a failure has occurred in one of the first and second converter units. Said fault detecting module enables a faster indication of a failure which gives the control unit extra time for analysis and counteractions. However, it is possible that the tolerances of the electrical ratings of the devices included in the first and second converter units (valves, dc link capacitors etc) are such that the dc-voltage of one of the first and second converter units differs enough from the dc-voltage of the other parallel-connected converter unit to indicate a failure. In one embodiment this problem is solved by the control unit by delaying the control signal to one of the first and second converter units for up to 5 μs to compensate for said tolerances and make the dc-voltages equal or at least close to equal. Due to the very short delay in relation to the switching frequency of the valves, the first and second converter units can be considered as substantially synchronously controlled. By the expression "substantially synchronously controlled" is meant that the control signal to one of the first or second converter unit in some situations could be slightly delayed for a maximum of 5 μs for reasons mentioned above.

According to an embodiment of the invention said at least one cell module includes a heat sink and the first and second converter units are thermally connected to the heat sink. Each of the first and second converter units are preferably mounted on a base plate which in turn is mounted on each side of the heat sink. The heat sink could be cooled with water or forced air. The use of a common heat sink for both the converter units will reduce the cost.

According to an embodiment of the invention the heat sink is arranged to use forced air or deionized water as a cooling medium.

According to an embodiment of the invention said at least one cell module is provided with a connection terminal for connection to the next cell module in the series, and the ac-side of each of the first and second converter units comprises an inductor in the converter unit and connected between the ac-side of the converter unit and the connection terminal of the cell module.

A line inductor is needed in each phase in series with the voltage source converter for current control and filtering purposes. In this embodiment each converter unit have a distributed inductor integrated which is also beneficial for parallel connected converter units in order to avoid circulating currents between the first and second converter units due to differences in the operation of said converter units. The integrated inductor is preferably designed so that the need for a common line inductor is eliminated completely which will reduce the cost.

According to a second aspect of the invention the object of the invention is achieved by a method for fault handling of a cell module in a voltage source converter.

The method for fault handling of a cell module in a voltage source converter having a plurality of cell modules connected in series, each cell module comprising a converter unit having an ac-side and a dc-side, where at least one of the cell modules comprises a second redundant converter unit having an ac-side which is connected in parallel with the ac-side of the first converter unit is characterised by the method steps:
  synchronously controlling the first and the second converter units,
  continuously monitoring a dc-voltage across each of the first and second converter units of the at least one cell module,
  continuously comparing the dc-voltages across the first and second converter units, and
  detecting a failure in one of the converter units on the basis of the differences between the dc-voltages across the first and second converter units.

The dc-voltages across each of the first and second converter units are normally equal. A divergence of said dc-voltages from each other indicates that a failure has occurred in one of the first and second converter units. The method to continuously comparing the dc-voltages across the first and second converter units and detecting a failure in one of the converter units on the basis of the differences between the dc-voltages across the first and second converter units enables a faster indication of the failure which gives the control unit extra time for analysis and counteractions.

According to an embodiment of the invention the control unit is configured to control one of the converter units with a delay, shorter than 5 μs, in order to keep the dc voltages across the first and second converter unit equal or close to equal.

According to an embodiment of the invention each of the first and second converter unit comprise a plurality of electrical valves and the method further includes the method steps:
  controlling the valves according to a first switching pattern during normal operation of the converter units, and
  controlling the valves according to a second switching pattern having a lower switching frequency than the first switching pattern upon detecting a failure in one of the first and second converter units.

Since the switching losses will be reduced, the moment in time when the converter unit reaches its thermal limit will be delayed. This extra time can be used by the control unit to identify which type of failure that has occurred and analyse the possibility to take counteractions.

According to an embodiment of the invention the second switching pattern is designed to control the valves to provide zero or close to zero output voltage at the ac-side of each of the first and second converter units. The advantages with this embodiment is the same as described in the paragraph above but since the cell module provides zero or close to zero output voltage at its ac-side, the cell module will not contribute to the total output voltage of the voltage source converter. However, since the switching losses are reduced to an absolute minimum the thermal limit will be delayed to a maximum extent.

According to an embodiment of the invention the method further includes the method step:
  detecting the presence of a failure in one of the converter units and upon detecting that the failure has disappeared controlling the valves according to the first switching pattern.

There is a possibility that the failure is of a temporary nature which will give the control unit an opportunity to resume the first switching pattern. This is an advantage as the voltage source converter only has a limited number of redundant cell modules to replace failed cell modules.

According to an embodiment of the invention the at least one cell module further includes a bypass switch configured to bypass the cell module upon receiving a triggering signal and the method further includes the method step:
  generating said triggering signal to the bypass switch at a certain time after the occurrence of a failure has been detected in any of the first and second converter units. The load current through the still healthy converter unit will increase after the occurrence of the failure and thus the temperature will also increase. If said healthy converter unit exceeds its thermal limit there is a risk of a failure also in the still healthy converter unit. On the other hand, it is an advantage to delay the activation of the bypass switch as long as possible for reasons mentioned above. A convenient way to accomplish such a delay is by generating the triggering signal to the bypass switch a certain time after the occurrence of the failure has been detected.

According to an embodiment of the invention the at least one cell module further includes a bypass switch configured to bypass the cell module upon receiving a triggering signal and the method further includes the method step:

generating said triggering signal to the bypass switch when the temperature of the at least one cell module exceeds a threshold value. By measuring the temperature of the cell module, the optimal delay of the bypass activation switch can be more accurately determined.

BRIEF DESCRIPTION OF THE DRAWINGS

The present invention will be more fully described by way of example with reference to the accompanying drawings in which.

DETAILED DESCRIPTION OF THE INVENTION

Figure 1:
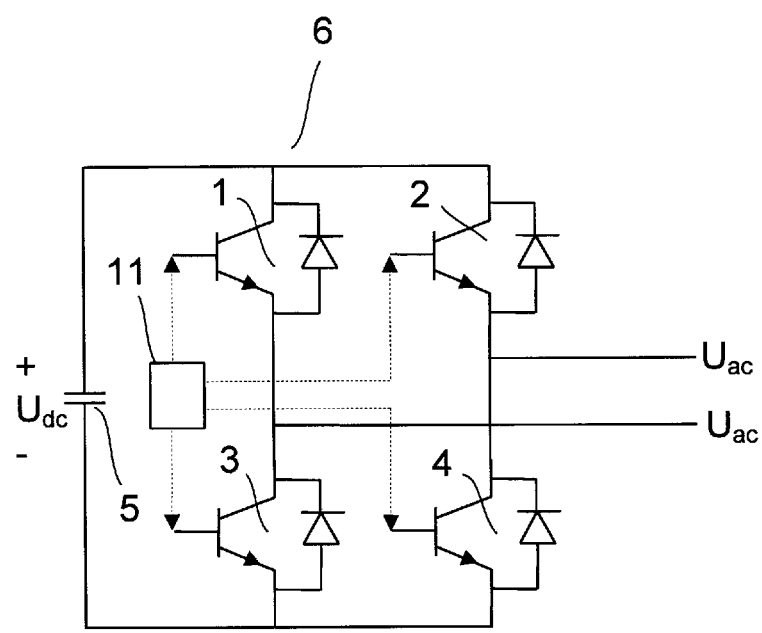
FIG. 1 shows a schematic figure of a cell module according to prior art.
Figure 2:
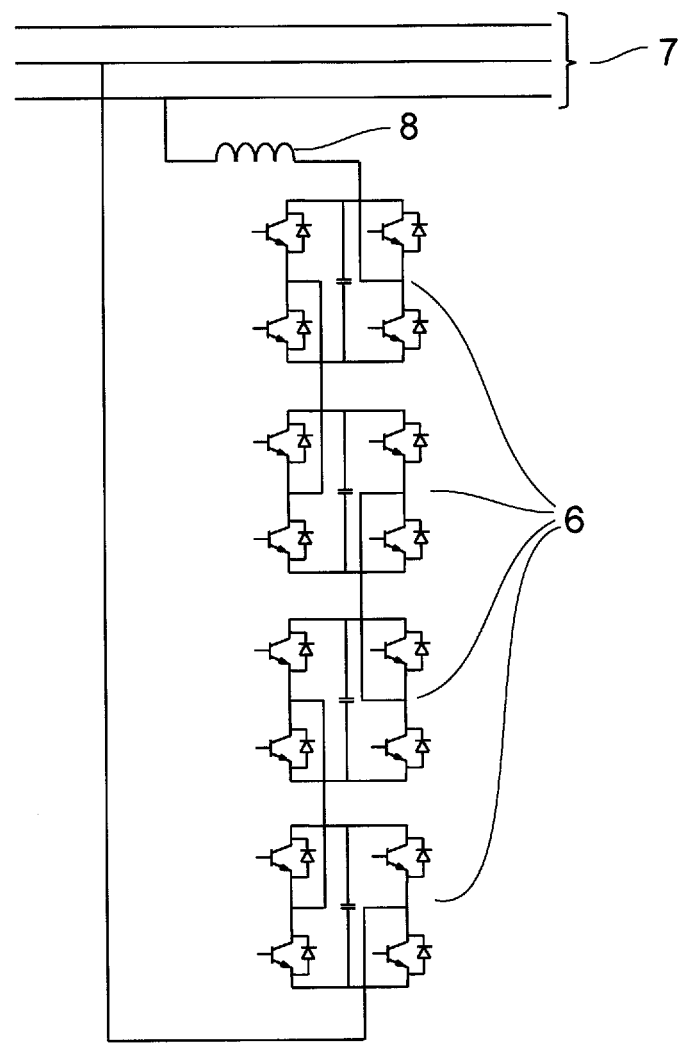
FIG. 2 shows a schematic figure of one phase of a multilevel voltage source converter according to prior art.
Figure 3:
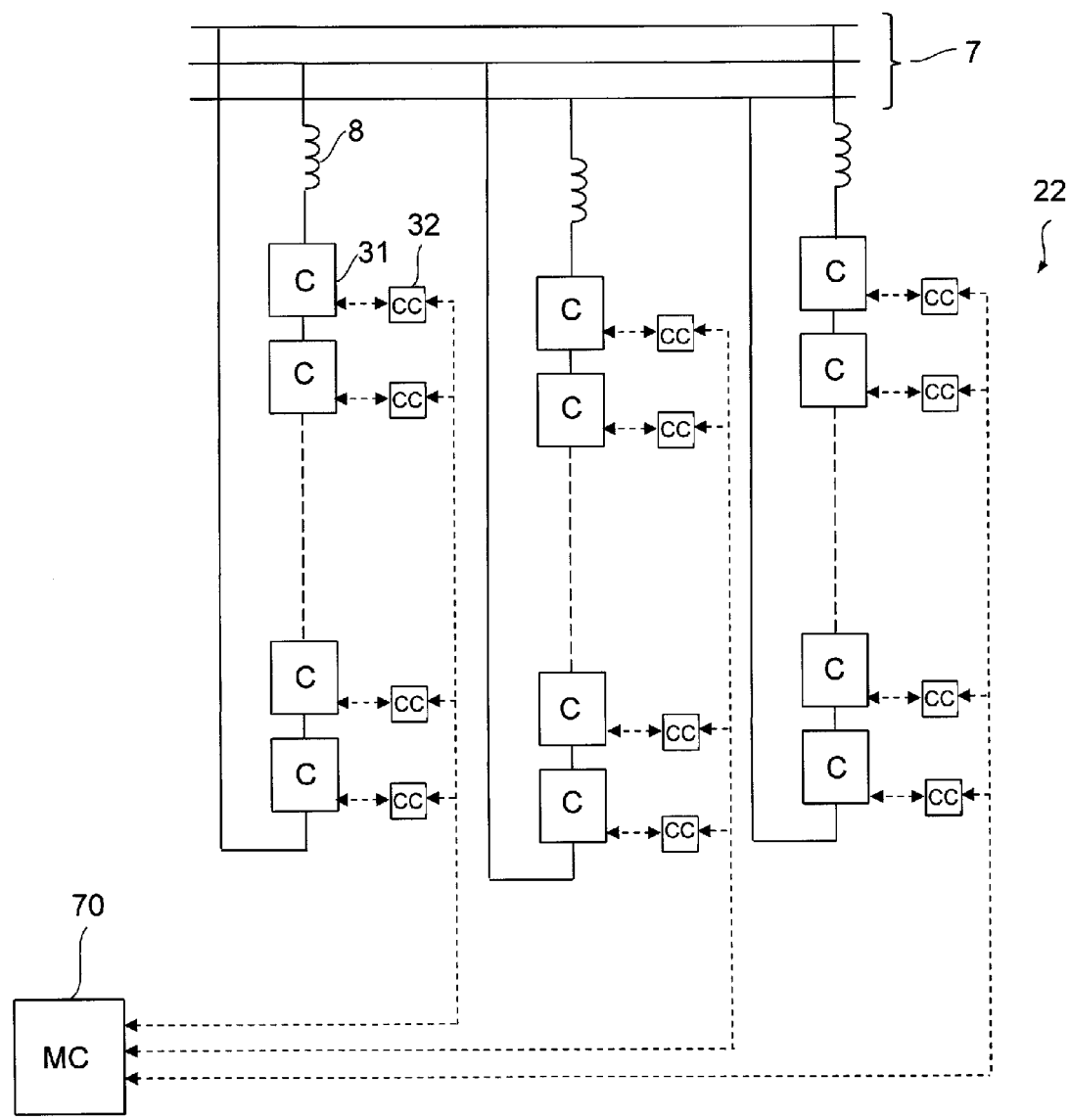
FIG. 3 shows a schematic figure of a voltage source converter according to an embodiment of the invention.

FIG. 3 illustrates a three-phase voltage source converter 22 according to an embodiment of the invention and a high voltage transmission line or medium voltage distribution line 7 to which the voltage source converter is connected. The invention is however not restricted to voltage source converters having three phases. The voltage source converter 22 can be connected in a delta or a wye arrangement. Each phase includes a plurality of cell modules 31 and a line inductor 8 connected in series. The line inductor 8 is needed for current control and filtering purposes. The number of cell modules varies and can be more than one hundred. The voltage source converter 22 further includes a control unit adapted to control the output voltage of each cell module 31 and thus the voltage of the voltage source converter which is the sum of the voltage of each series-connected cell module 31. The control unit includes a main controller 70, a plurality of cell controllers 32 and a plurality of valve controllers (not shown in FIG. 3). The main controller 70 sends control signals, via the cell controllers 32, to the valve controllers in order to control the cell modules. The cell modules 31 can include any of the cell modules 15, 16 or 17 which will be described in more detail below with references to FIGS. 4-6. The cell controllers 32 can include any of the cell controllers 33, 34 which also will be described in more detail below with references to FIGS. 4-6.

Figure 4:
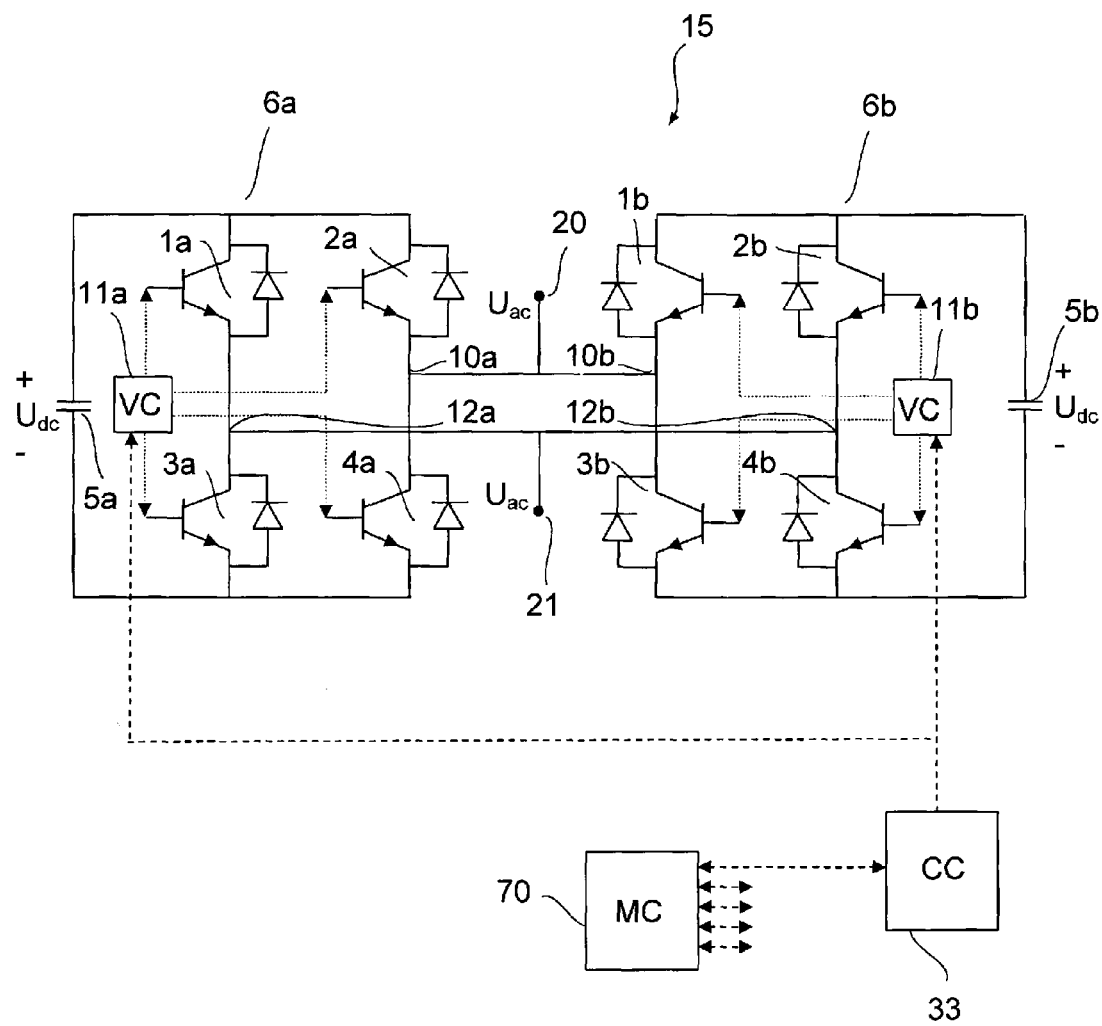
FIG. 4 shows a detailed figure of a first example of a cell module for a voltage source converter according to the invention.

In FIG. 4 a first example of a cell module 15 for a voltage source converter 22 according to the invention is illustrated. As in the prior art each cell module 15 includes a converter unit 6a-b including a plurality of electrical valves 1a-4a, 1b-4b connected in an H-bridge arrangement with a dc link capacitor bank 5a-b. Each converter unit 6a-b further includes a valve controller 11a-b adapted to receive control signals from the main controller 70 configured to control the valves 1a-4a, 1b-4b according to a first switching pattern during normal operation, for example by using a suitable pulse width modulation (PWM) technique, in order to transform a dc-voltage on a dc-side of the converter unit 6a-b into an ac-voltage on an ac-side of the converter unit 6a-b. In the first switching pattern each valve 1a-4a, 1b-4b is switched on and off a number of times during a fundamental frequency cycle of the line 7 to which the voltage source converter is connected. By controlling the timing of the switching within such fundamental frequency cycles, each cell module 15 provides a desired ac-voltage summing up to a total voltage of the voltage source converter 22 being the sum of the ac-voltages of each cell module 15.

The cell module 15 differs from prior art cell modules in that the cell module 15 in addition to a first converter unit 6a includes a second redundant converter unit 6b. The ac-sides of the first and second converter units 6a-b are connected in parallel by connecting a first connection point 10a of the first converter unit 6a with a first connection point 10b of the second converter unit 6b and connecting a second connection point 12a of the first converter unit 6a with a second connection point 12b of the second converter unit 6b. The parallel-connection of the ac-sides of the converter units 6a-b is provided with connection terminals 20, 21 for connection of the cell module to the next cell module in the series connection. An arbitrarily number of cell modules can be connected in series in order to match the voltage level of the line 7.

During normal operation the load current through the cell module will be uniformly, or close to uniformly, shared between the first 6a and second 6b converter units, respectively.

The main controller 70 sends control signals to the valve controllers 11a-b of each cell module 15 via the cell controller 33. Alternatively, the control signals could be sent directly from the main controller 70 to the valve controllers 11a-b. Identical control signals are received by the valve controllers of the first and second converter units which will control the valves to output the desired ac voltage. The first and the second converter units are accordingly synchronously controlled. Thus, in case of a failure in one of the first and second converter units 6a-b, the other parallel-connected converter unit will immediately take over the load current previously flown through the failed converter unit. This solution will prevent a high voltage and extreme energy development in the cell module 15. As a result the failed cell module will not run a risk of destroying any adjacent equipment or jeopardizing the continuing operation of the voltage source converter.

As mentioned above, the valves are controlled according to the first switching pattern during normal operation of the converter units. In one embodiment the valves 1a-4a, 1b-4b are controlled according to a second switching pattern, having a lower switching frequency than the first switching pattern, upon detecting a failure in one of the first and second converter units 6a-b. By controlling the valves 1a-4a, 1b-4b according to the second switching pattern, switching losses are reduced which means that the moment in time when the converter unit 6a-b reaches its thermal limit will be delayed. This extra time can be used by the control unit to identify which type of failure that has occurred and analyse the possibility to take counteractions. There is also a possibility that the failure is of a temporary nature and disappears which will give an opportunity to resume the first switching pattern. This is an advantage as the voltage source converter 22 only has a limited number of redundant cell modules to replace failed cell modules.

In one embodiment the second switching pattern is designed to control the valves 1a-4a, 1b-4b to provide zero or close to zero output voltage at the ac-side of each of the first and second converter units 6a-b. The zero output voltage can be achieved by controlling the electrical valves 1a-4a, 1b-4b of the first 6a and second 6b converter unit such that forward-biased electrical valves 1a-4a, 1b-4b are switched on. For example, if the current through the cell module 15 is flowing from the connection terminal 20 to the connection terminal 21, the electrical valves 1a and 4a of the converter unit 6a and the electrical valves 2b and 3b of the converter unit 6b are switched on.

Fault detecting units for detecting failures in the cell modules can be implemented at different levels of the control unit. With different levels is for example meant the main controller 70, the cell controller 33, 34 and the valve controller 11a-b, the main controller 70 being located on the top level and the valve controller 11a-b being located at the bottom level of the control unit. The fault detecting unit can for example be implemented in the main controller 70 and failures can be detected based on information provided by available sensors in the valves 1a-4a, 1b-4b and/or converter units 6a-b and sent to the main controller 70 for evaluation. The fault detecting unit can alternatively or additionally be implemented in the cell controller 33, 34 or in the valve controller 11a-b. In one embodiment a dc-voltage monitoring module in the valve controller 11a-b is adapted to continuously monitor the dc-voltage across each of the first 6a and second 6b converter units and send information of the dc-voltages to the fault detecting module in the cell controller 33, 34 which is adapted to compare said dc-voltages and on basis thereon detect a failure in one of the converter units 6a-b. The dc-voltage monitoring module can also be implemented in other parts of the control unit.

The dc-voltages across each of the first and second converter units are normally equal. A divergence of said dc-voltages from each other indicates that a failure has occurred in one of the first and second converter units. Said fault detecting module enables a faster indication of a failure which gives the control unit extra time for analysis and counteractions. However, it is possible that the tolerances of the electrical ratings of the devices included in the first and second converter units (valves 1a-4a, 1b-4b, dc link capacitors 5a-b etc) are such that the dc-voltage of one of the first and second converter units 6a-b differs enough from the dc-voltage of the other parallel-connected converter unit 6a-b to indicate a failure. In one embodiment this problem is solved by the control unit by delaying the control signal to one of the first and second converter units 6a-b for up to 5 μs to compensate for said tolerances and make the dc-voltages equal or at least close to equal. Due to the very short delay in relation to the switching frequency of the valves, the first and second converter units 6a-b can be considered as substantially synchronously controlled. By the expression "substantially synchronously controlled" is meant that the control signal to one of the first or second converter unit in some situations could be slightly delayed for a maximum of 5 μs for reasons mentioned above.

Figure 5:
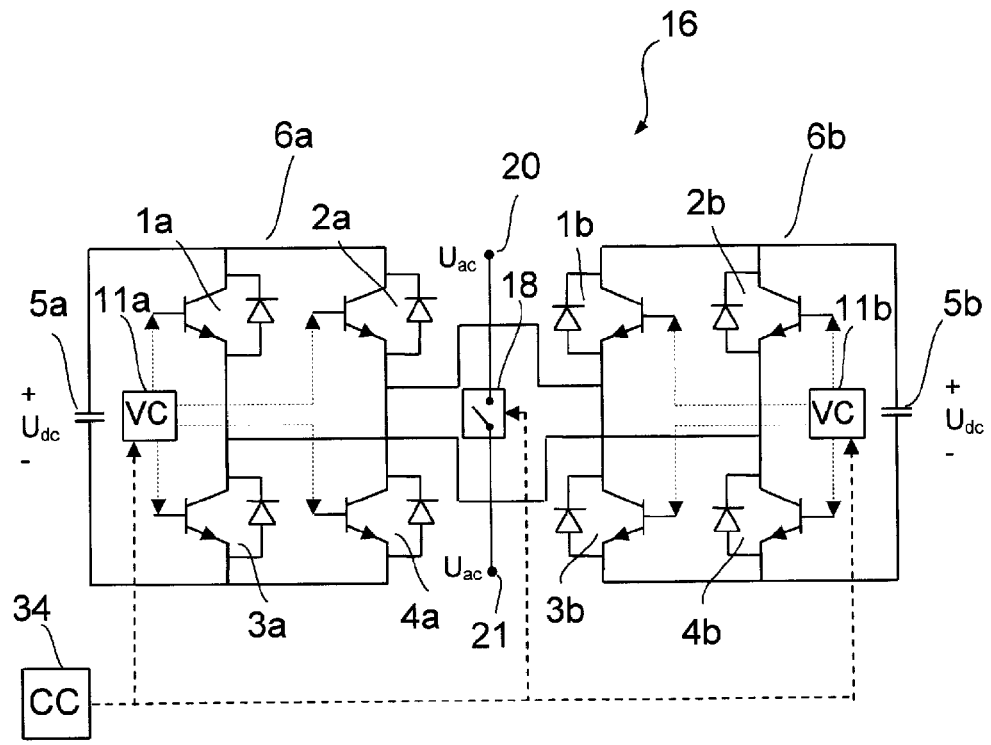
FIG. 5 shows a detailed figure of a second example of a cell module for a voltage source converter according to the invention.

In FIG. 5 another example of a cell module 16 for the voltage source converter according to the invention is illustrated. The same reference numerals are used throughout the figures for same or corresponding parts. The cell module 16 differs from the cell module 15 in that it further includes a bypass switch 18 configured to bypass the cell module 16 upon receiving a triggering signal from the control unit. The triggering signal can be sent from the main controller 70 (not shown) or via the cell controller 34.

As a result of a failure in one of the first or second converter unit 6a-b, a second failure in the still healthy converter unit would jeopardize the functionality of the entire voltage source converter 22. The bypass switch 18 is provided to safely bypass the load current and accordingly to ensure a continued operation of the voltage source converter 22. The bypass switch 18 can be a simple mechanical closing switch without any special requirements on speed of operation etc. owing to the second redundant converter unit and its overloading capacity. Once the bypass switch 18 has been closed it will not be opened again. A mechanical bypass switch 18 has the advantage of low conduction losses, however semiconductor switches such as IGBTs and MOSFETs can also be used.

The control unit does not have to generate the triggering signal immediately after a fault has occurred. Another possibility is to generate said triggering signal to the bypass switch 18 a certain time after the occurrence of a failure has been detected in any of the first and second converter units 6a-b. It is an advantage to delay the activation of the bypass switch 18 as long as possible as the failure can be temporary which will give the control unit an opportunity to resume the first switching pattern. This is an advantage as the voltage source converter 22 only has a limited number of redundant cell modules 16 to replace the failed cell modules 16. A convenient way to accomplish such a delay is by generating the triggering signal to the bypass switch a certain time after the occurrence of the failure has been detected.

Another possibility is to generate said triggering signal to the bypass switch 18 when the temperature of the cell module 16 exceeds a threshold value. By measuring the temperature of the cell module, an optimal delay of the bypass switch 18 can be more accurately determined. The triggering signal is sent from the main controller 70 via the cell controller 34, or directly from the main controller 70, based on information provided by available temperature sensors in the valves 1a-4a, 1b-4b and/or converter units 6a-b.

Figure 6:
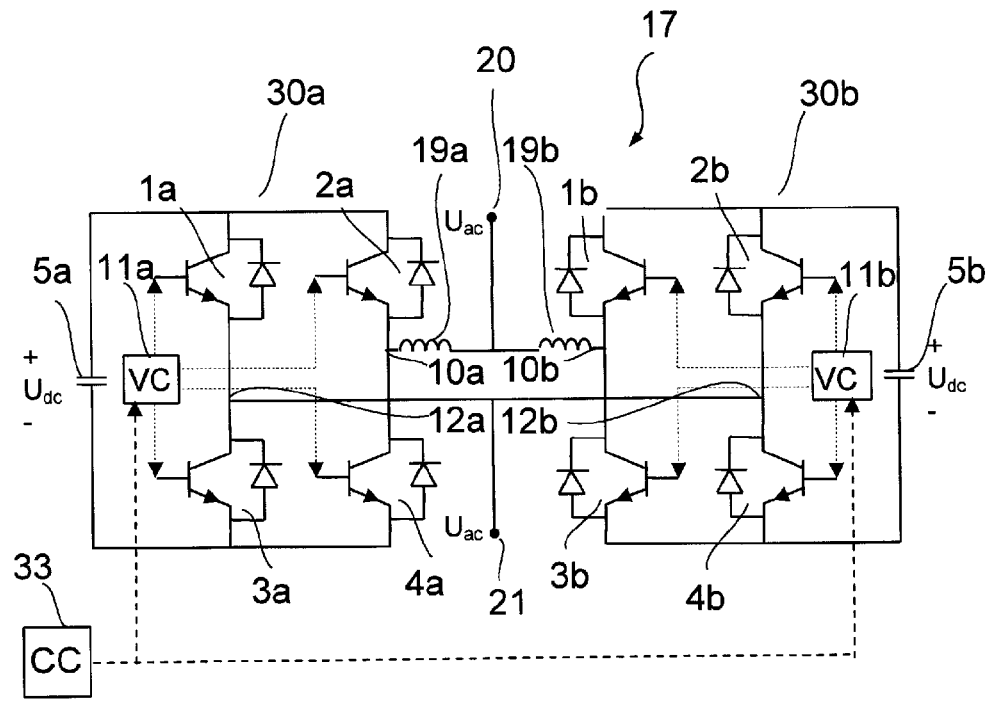
FIG. 6 shows a detailed figure of a third example of a cell module for a voltage source converter according to the invention.

In FIG. 6 yet another example of a cell module 17 for the voltage source converter according to the invention is illustrated. The cell module 17 differs from the cell module 15 in that it is further provided with an inductor 19a-b in each of the converter units 30a-b and connected between the first connection point 10a-b of the ac-side of each converter unit 30a-b and the connection terminal 20 of the cell module 17. Alternatively, each inductor 19a-b is connected between the second connection point 12a-b of the ac-side of each converter unit 30a-b and the connection terminal 21 of the cell module 17.

A line inductor 19a-b is needed in each phase in series with the cell modules 15-17 for current limiting and filtering purposes. In this embodiment each converter unit 30a-b has a distributed inductor. This is also beneficial in order to avoid circulating currents between the first and second converter units 30a-b due to differences in the operation of said converter units 30a-b. The inductor 19a-b is preferably designed such that the need for a common line inductor is eliminated completely which will reduce the cost. The inductor can be integrated in each of the first and second converter units or alternatively placed in the vicinity of the first and second converter units.

Figure 7:
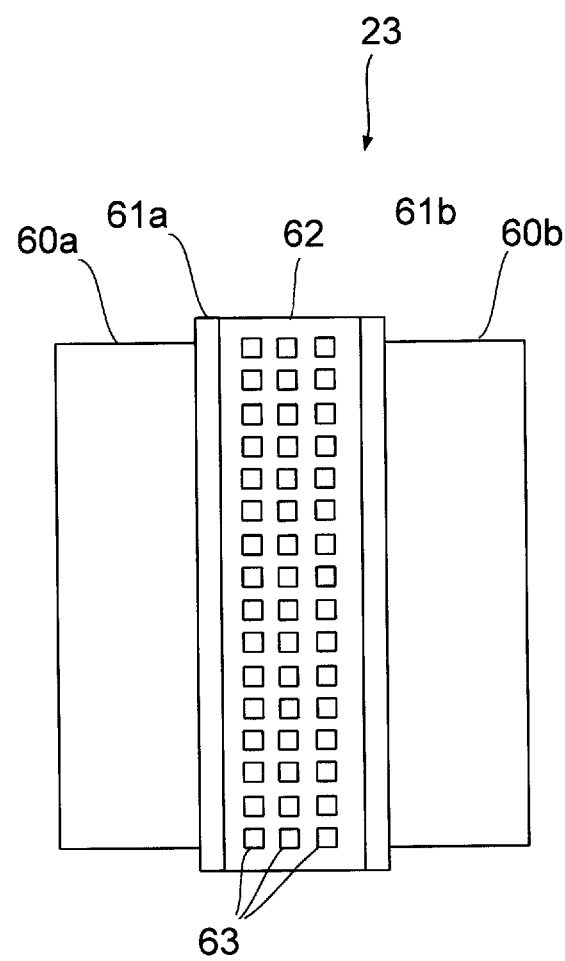
FIG. 7 shows a cell module including a first and a second converter unit mounted on a heat sink.

FIG. 7 shows an example of a schematic figure of the cell module 23 and a heat sink 62 thermally connected to the first and second converter units 60a-b. In the cell module shown in FIG. 7 each of the first and second converter units are mounted on a base plate 61a-b which in turn is mounted on each side of the heat sink 62. The heat sink 62 could be cooled with water or forced air flowing through holes 63 in the heat sink. The converter units 60*a*-*b* can include any of the converter units 6*ab*, 30*a*-*b*. Alternatively, each of the first and second converter units has a heat sink to which they are thermally connected.

The invention claimed is:

1. A voltage source converter having a plurality of cell modules connected in series, each cell module comprising a first converter unit having an ac-side and a dc-side, and the voltage source converter comprises a control unit adapted to control the first converter units,
   wherein at least one of the cell modules comprises a second converter unit having an ac-side which is connected in parallel with the ac-side of the first converter unit of the at least one cell module and the control unit is configured to substantially synchronously control the first and the second converter units, wherein each of the first and second converter units comprise a plurality of electrical valves and the control unit is configured to control the valves according to a first switching pattern during normal operation of the converter units and according to a second switching pattern having a lower switching frequency than the first switching pattern upon detecting a failure in one of the first and second converter units.

2. The voltage source converter according to claim 1, wherein the second switching pattern is designed to control the valves to provide zero or close to zero output voltage at the ac-side of each of the first and second converter units.

3. The voltage source converter according to claim 1, wherein the at least one cell module further comprises a bypass switch configured to bypass the cell module upon receiving a triggering signal from the control unit.

4. The voltage source converter according to claim 1, wherein the control unit comprises a fault detecting unit adapted to detect the presence of a failure in one of the converter units and upon detecting that the failure has disappeared the control unit is configured to control the valves according to the first switching pattern.

5. The voltage source converter according to claim 3, wherein the control unit is adapted to generate said triggering signal to the bypass switch at a specified time after the occurrence of a failure has been detected in any of the first and second converter units.

6. The voltage source converter according to claim 3, wherein the control unit is adapted to generate said triggering signal to the bypass switch when the temperature of the at least one cell module exceeds a threshold value.

7. The voltage source converter according to claim 1, wherein the voltage source converter comprises a dc-voltage monitoring module adapted to continuously monitor a dc-voltage across each of the first and second converter units and a fault detecting module adapted to compare the dc-voltages across the first and second converter units and on basis thereof detect a failure in one of the converter units.

8. The voltage source converter according to claim 1, wherein said at least one cell module comprises a heat sink and the first and second converter unit are thermally connected to the heat sink.

9. The voltage source converter according to claim 8, wherein the heat sink is arranged to use forced air or deionized water as a cooling medium.

10. The voltage source converter according to claim 1, wherein said at least one cell module is provided with a connection terminal for connection to the next cell module in the series, and the ac-side of each of the first and second converter units comprises an inductor in the converter unit and connected between the ac-side of the converter unit and the connection terminal of the cell module.

11. A method for fault handling of a cell module in a voltage source converter having a plurality of cell modules connected in series, each cell module comprising a first converter unit having an ac-side and a dc-side, where at least one of the cell modules comprises a second converter unit having an ac-side which is connected in parallel with the ac-side of the first converter unit of the at least one cell module, wherein the method comprises the steps of:
   substantially synchronously controlling the first and the second converter units,
   continuously monitoring a dc-voltage across each of the first and second converter units of the at least one cell module,
   continuously comparing the dc-voltages across the first and second converter units, and
   detecting a failure in one of the converter units based on determining differences between the dc-voltages across the first and second converter units.

12. The method according to claim 11, wherein the control unit is configured to control one of the converter units with a delay, shorter than 5 μs, in order to keep the dc voltages across the first and second converter units equal or close to equal.

13. The method according to claim 11, wherein each of the first and second converter units comprises a plurality of electrical valves and the method further comprising the steps of:
   controlling the valves according to a first switching pattern during normal operation of the converter units, and
   controlling the valves according to a second switching pattern having a lower switching frequency than the first switching pattern upon detecting a failure in one of the first and second converter units.

14. The method according to claim 13, wherein the second switching pattern is designed to control the valves to provide zero or close to zero output voltage at the ac-side of each of the first and second converter units.

15. The method according to claim 11, wherein the method comprises detecting the presence of a failure in one of the converter units and upon detecting that the failure has disappeared controlling the valves according to the first switching pattern.

16. The method according to claim 11, wherein the at least one cell module further comprises a bypass switch configured to bypass the cell module upon receiving a triggering signal and the method further comprises generating said triggering signal to the bypass switch at a specified time after the occurrence of a failure has been detected in any of the first and second converter units.

17. The method according to claim 11, wherein the at least one cell module further comprises a bypass switch configured to bypass the cell module upon receiving a triggering signal and the method further comprises generating said triggering signal to the bypass switch when the temperature of the at least one cell module exceeds a threshold value.

18. A voltage source converter comprising:
   a plurality of cell modules connected in series, each cell module having a first converter unit having an ac-side and a dc-side;
   a control unit adapted to control the converter units for each cell module;
   wherein at least one of the cell modules includes a second converter unit having an ac-side connected in parallel with the ac-side of the first converter unit of the at least one cell module, and
   wherein said control unit is configured to synchronously control the first and the second converter units.

* * * * *